United States Patent
Paller et al.

(10) Patent No.: US 11,510,411 B2
(45) Date of Patent: Nov. 29, 2022

(54) OVEN APPLIANCE AND METHODS FOR HIGH-HEAT COOKING

(71) Applicant: Haier US Appliance Solutions, Inc., Wilmington, DE (US)

(72) Inventors: Hans Juergen Paller, Louisville, KY (US); Rebekah Tyler, Louisville, KY (US); Eric Scott Johnson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 230 days.

(21) Appl. No.: 17/071,606

(22) Filed: Oct. 15, 2020

(65) Prior Publication Data

US 2022/0117238 A1  Apr. 21, 2022

(51) Int. Cl.
| | |
|---|---|
| *F24C 1/08* | (2021.01) |
| *F24C 7/00* | (2006.01) |
| *F24C 7/04* | (2021.01) |
| *F24C 7/08* | (2006.01) |
| *A21B 1/02* | (2006.01) |
| *A21B 1/06* | (2006.01) |
| *A21B 1/40* | (2006.01) |

(52) U.S. Cl.
CPC ..................................... *A21B 1/40* (2013.01)

(58) Field of Classification Search
CPC ........ F24C 1/08; F24C 1/14; F24C 7/00–004; F24C 7/04–046; F24C 7/06–067; F24C 7/08–081; A21B 1/02; A21B 1/06; A21B 1/14–22; H05B 1/0263
See application file for complete search history.

(56) References Cited

U.S. PATENT DOCUMENTS

| | | | |
|---|---|---|---|
| 6,943,321 B2 | 9/2005 | Matthew | |
| 9,995,492 B2 | 6/2018 | James | |
| 10,502,430 B1 | 12/2019 | Alvey | |
| 2007/0084849 A1* | 4/2007 | Smith | F24C 7/08 219/413 |
| 2014/0048058 A1* | 2/2014 | Donarski | F24C 7/06 126/39 BA |
| 2015/0208669 A1 | 7/2015 | Chamixaes | |
| 2018/0259191 A1* | 9/2018 | Polster | A21B 1/40 |
| 2021/0404745 A1* | 12/2021 | Johnson | A23L 5/15 |
| 2022/0078889 A1* | 3/2022 | Bhogal | H05B 1/0263 |

\* cited by examiner

*Primary Examiner* — Michael A Laflame, Jr.
(74) *Attorney, Agent, or Firm* — Dority & Manning, P.A.

(57) ABSTRACT

An oven appliance may include a cabinet, a plurality of chamber walls, a cooking surface, a top heating element, a temperature sensor, and a controller. The cooking surface may be defined in a cooking chamber. The top heating element may be mounted above the cooking surface to heat the cooking chamber. The temperature sensor may be disposed within the cabinet. The controller may be configured to initiate a cooking operation that includes initiating preheat activation of the top heating element, receiving temperature signals from the temperature sensor during the preheat activation, determining a preheat threshold is met based on the received temperature signals, and initiating cooking activation of the top heating element based on a cooking cycle having a predetermined time interval subsequent to determining the preheat threshold is met. Initiating cooking activation may include directing the top heating element based on the cooking cycle for the predetermined time interval.

20 Claims, 7 Drawing Sheets

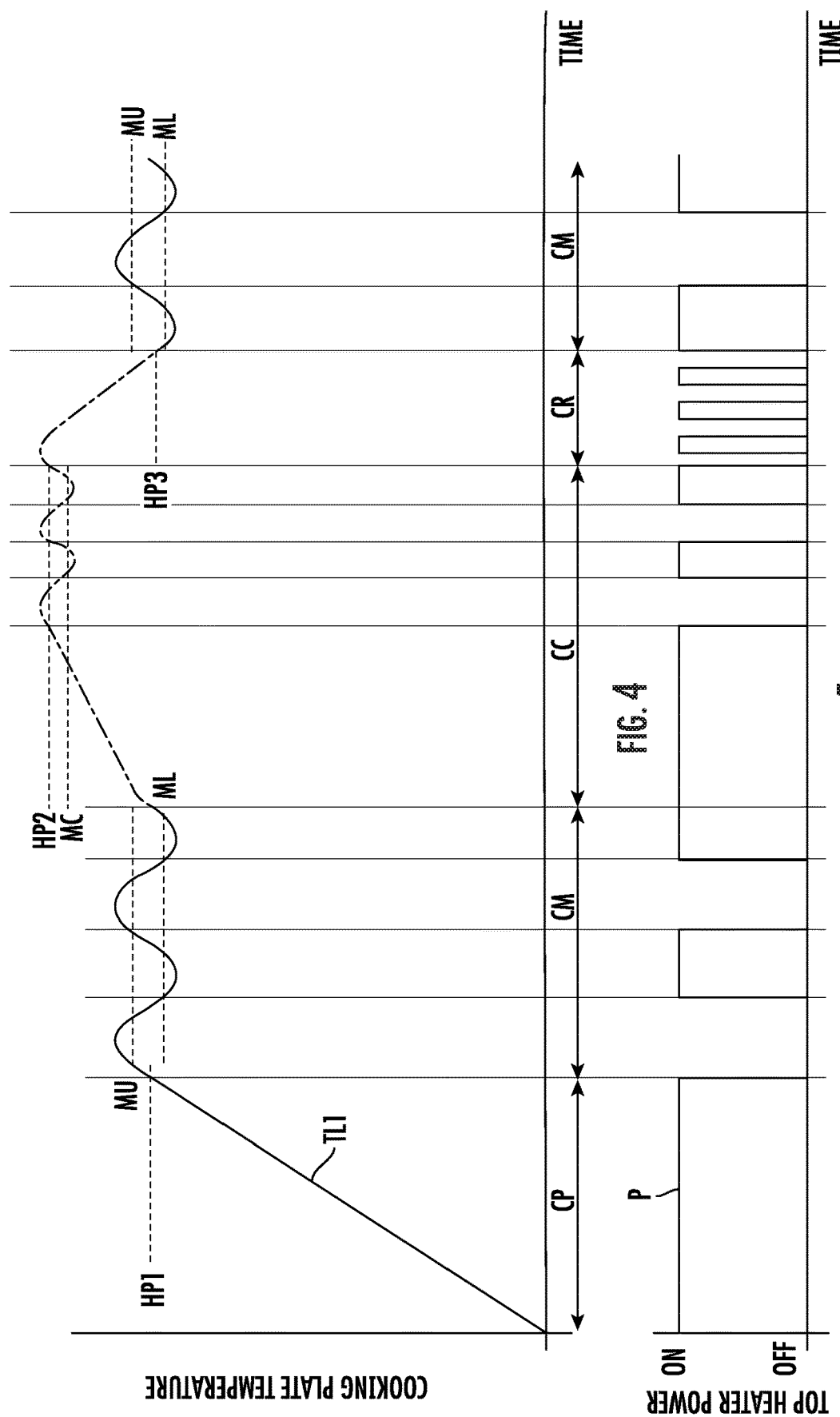

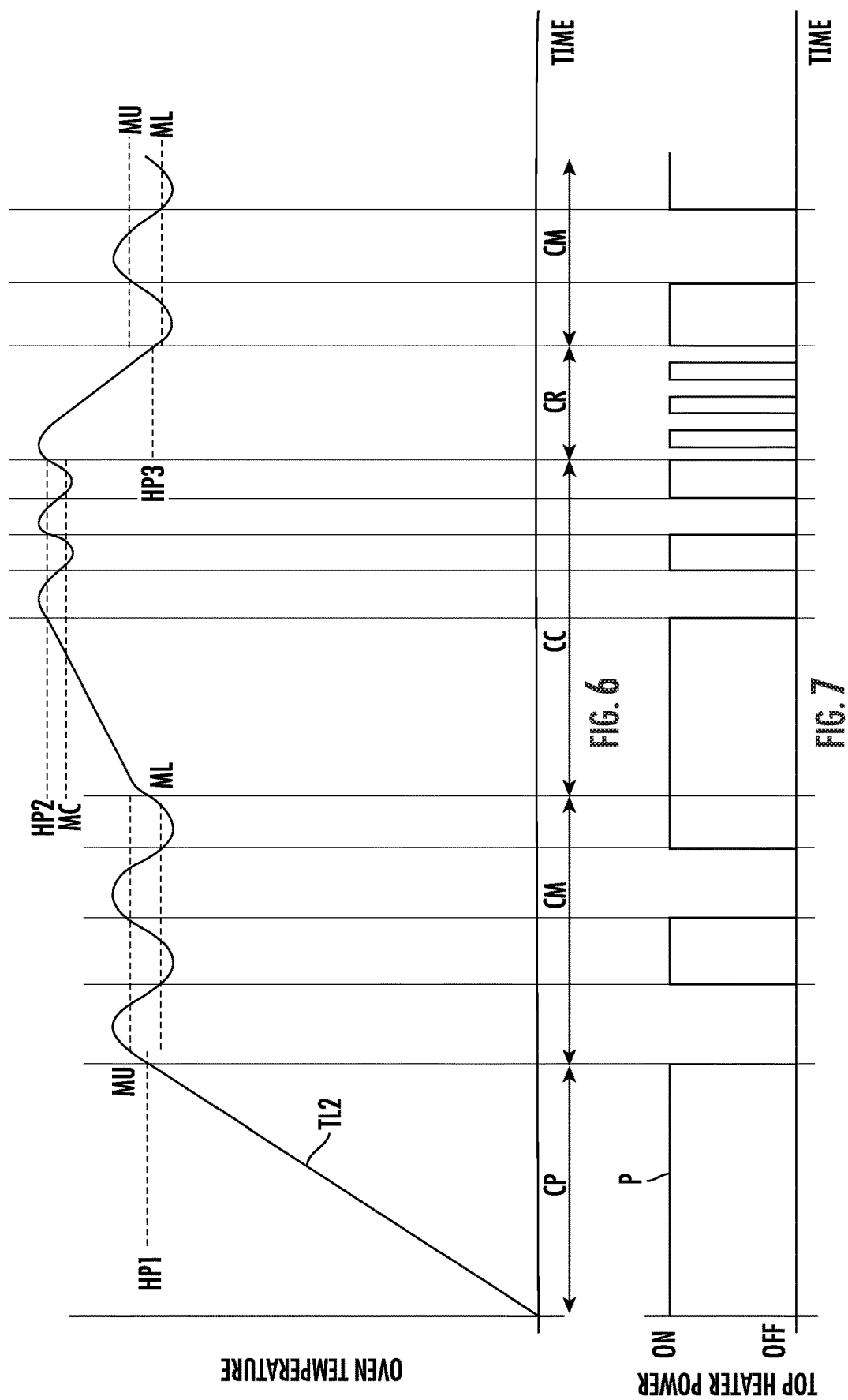

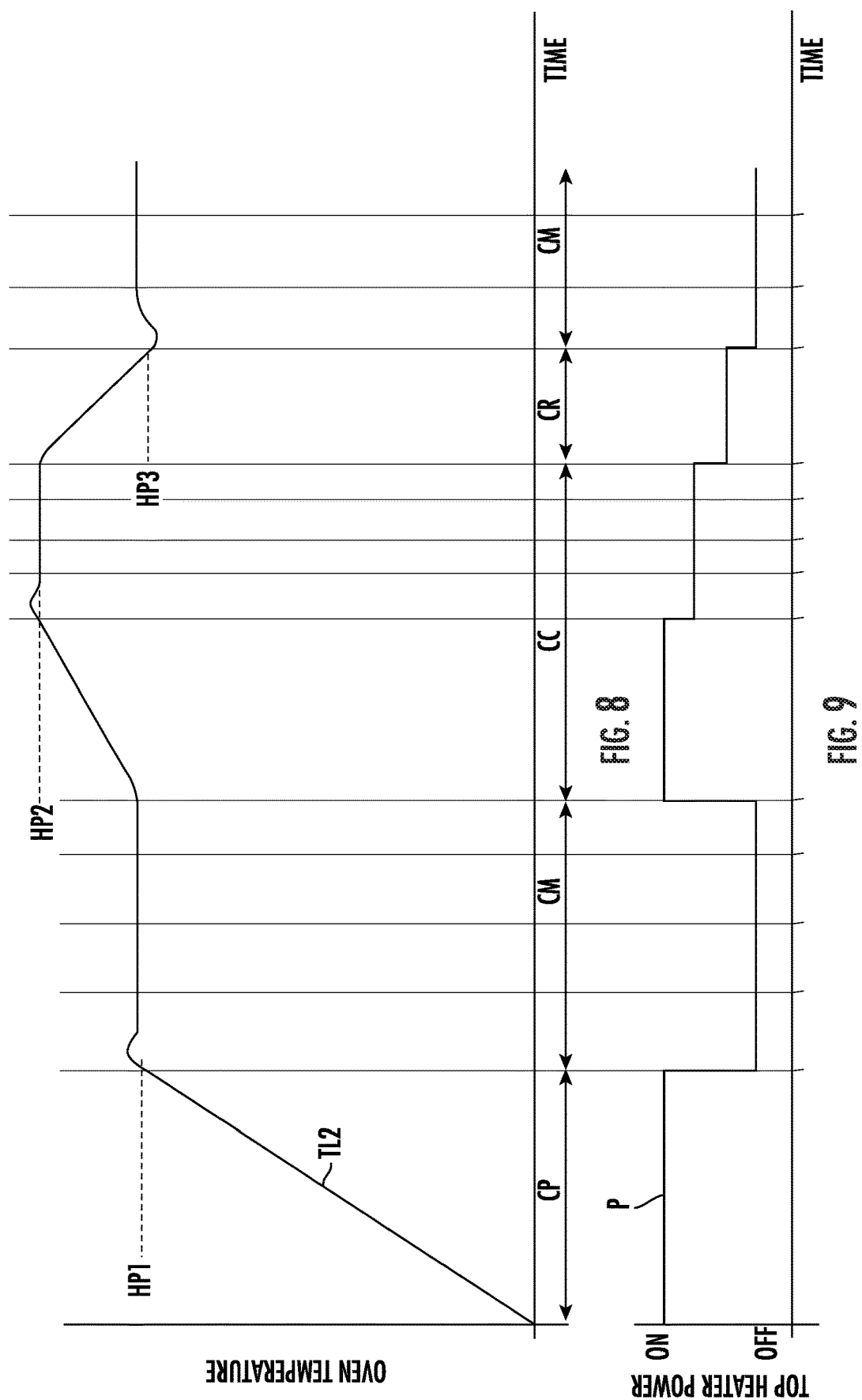

OVEN APPLIANCE AND METHODS FOR HIGH-HEAT COOKING

FIELD OF THE INVENTION

The present subject matter relates generally to oven appliances, and more particularly, to methods of operating an oven appliance for localized, high-heat cooking.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and a separate broiler heating assembly positioned at a top of the cooking chamber.

Typically, food or utensils for cooking are placed on wire racks within the cooking chamber and above the bake heating assembly. When the bake heating assembly is activated, heat from the bake heating assembly is thus forced to rise through an air gap, and any other intermediate elements, between the bake heating assembly and the wire rack before the utensil on the wire rack can be heated. Heat within the cooking chamber is relatively diffuse, and the temperature is generally consistent about the item or items on the rack.

Although these conventional configurations are useful for many types of foods, there are certain disadvantages. For instance, certain food items, such as pizzas or breads, may benefit from very high, localized (i.e., non-diffuse) heat for a relatively short amount of time. Some such cooking operations are commonly referred to as short-cycle cooking operations. Oftentimes, stone or specialized high-heat pans are used for trapping heat against the bottom of flat-breads or pizza. Such pans may be difficult to preheat or maintain at a specific temperature desired by the user. Although placing a pan closer to a bottom heating element may help heat the pan faster or to a higher temperature, this may cause the pan or trapped heat to damage portions of the oven appliance. Moreover, trapping or localizing heat too much, especially from the bottom, may lead to burning certain portions of a food item, without sufficiently cooking the rest.

Certain problems may be exacerbated by cooking multiple items in relatively quick succession. For instance, if a user attempts to cook multiple items, one right after the other, trapped heat may cause the later-cooked items to reach certain internal temperatures faster or at a different rate than the earlier-cooked items. This can result in inconsistent or unsuitable (e.g., burned) food items. As a result, typical cooking appliances require all heating elements to completely deactivate while the cooking chamber is allowed to cool significantly (e.g., to within 100° Fahrenheit of the ambient temperature).

Accordingly, it would be advantageous to provide an oven appliance or methods for safely generating high heat on a specific cooking surface within the oven appliance without unduly trapping heat or causing damage to the oven appliance or cooking surface. Additionally or alternatively, it would be advantageous to provide an oven appliance or methods for consistently cooking separate items at a high heat and in quick succession (e.g., without requiring the oven to completely deactivate or return to a temperature near the ambient temperature).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an oven appliance is provided. The oven appliance may include a cabinet, a plurality of chamber walls, a cooking surface, a top heating element, a temperature sensor, and a controller. The plurality of chamber walls may be mounted within the cabinet, the plurality of chamber walls defining a cooking chamber. The plurality of chamber walls may include a back wall, a top wall, a first side wall, a second side wall, and a bottom wall. The cooking surface may be defined in the cooking chamber between the bottom wall and the top wall of the plurality of chamber walls. The top heating element may be mounted above the cooking surface to heat the cooking chamber. The temperature sensor may be disposed within the cabinet. The controller may be in operative communication with the top heating element and the temperature sensor. The controller may be configured to initiate a cooking operation. The cooking operation may include initiating preheat activation of the top heating element and receiving one or more temperature signals from the temperature sensor disposed in the cooking chamber. The receiving may occur during the preheat activation of the top heating element. The cooking operation may further include determining a preheat threshold is met based on the received one or more temperature signals, and initiating cooking activation of the top heating element based on a cooking cycle having a predetermined time interval subsequent to determining the preheat threshold is met. Initiating cooking activation may include directing the top heating element based on the cooking cycle for the predetermined time interval.

In another exemplary aspect of the present disclosure, a method of operating an oven appliance is provided. The method may include initiating preheat activation of a top heating element. The method may also include receiving one or more temperature signals from a temperature sensor disposed within the oven appliance, receiving occurring during the preheat activation of the top heating element. The method may further include determining a preheat threshold is met based on the received one or more temperature signals, and initiating cooking activation of the top heating element based on a cooking cycle having a predetermined time interval subsequent to determining the preheat threshold is met. Initiating cooking activation may include directing the top heating element based on the cooking cycle for the predetermined time interval.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 is a graph view illustrating temperature over time for a temperature sensor mounted on a cooking plate within an oven appliance during a high-heat cooking operation according to exemplary embodiments of the present disclosure.

FIG. 5 is a graph view illustrating power output over time for a top heater within an oven appliance during the exemplary high-heat cooking operation of FIG. 4.

FIG. 6 is a graph view illustrating temperature over time for a temperature sensor mounted on a wall within an oven appliance during a high-heat cooking operation according to exemplary embodiments of the present disclosure.

FIG. 7 is a graph view illustrating power output over time for a top heater within an oven appliance during the exemplary high-heat cooking operation of FIG. 6.

FIG. 8 is a graph view illustrating temperature over time for a temperature sensor mounted on a wall within an oven appliance during a high-heat cooking operation according to exemplary embodiments of the present disclosure.

FIG. 9 is a graph view illustrating power output over time for a top heater within an oven appliance during the exemplary high-heat cooking operation of FIG. 8.

DETAILED DESCRIPTION

Figure 1:
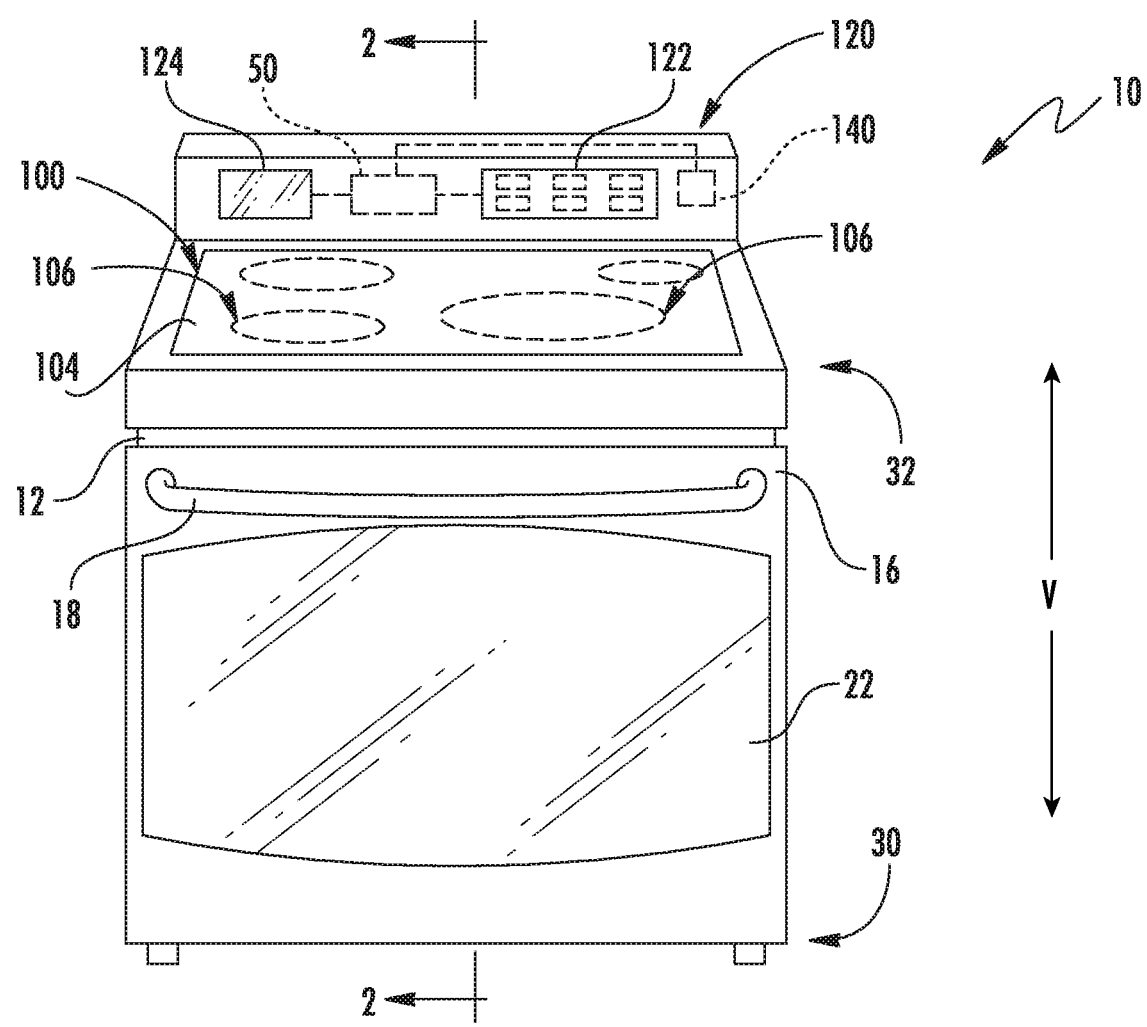
FIG. 1 provides a perspective view of an oven appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
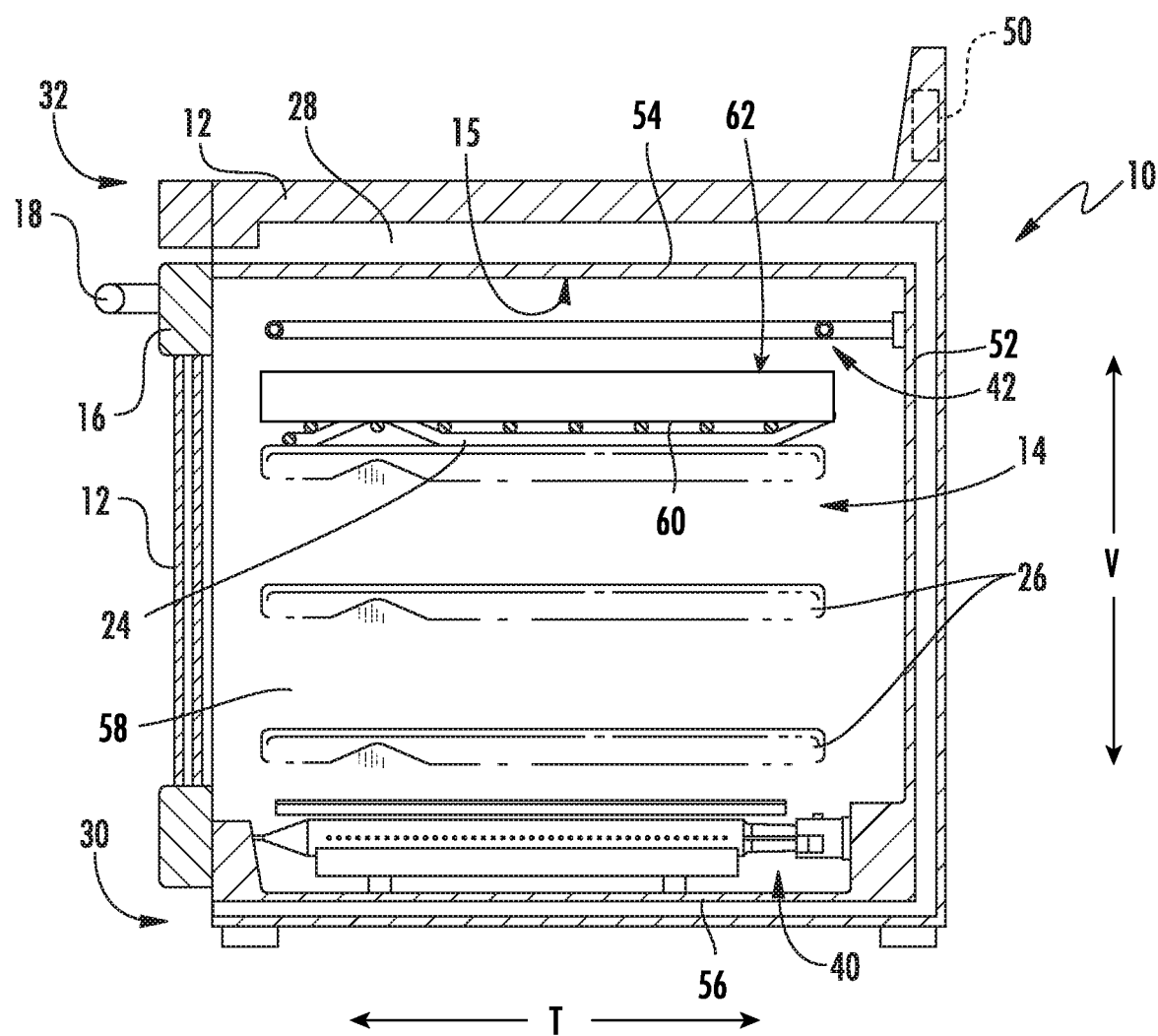
FIG. 2 provides a section view of the exemplary oven appliance of FIG. 1, taken along the line 2-2.

FIG. 1 provides a perspective view of an oven appliance 10 according to an exemplary embodiment of the present disclosure. FIG. 2 provides a section view of oven appliance 10 taken along the 2-2 line of FIG. 1. As may be seen, oven appliance 10 defines a vertical direction V, a lateral direction L and a transverse direction T. The vertical direction V, the lateral direction L and the transverse direction T are mutually perpendicular and form an orthogonal direction system.

Oven appliance 10 is provided by way of example only and is not intended to limit the present subject matter in any aspect. Other oven or range appliances having different configurations, different appearances, or different features may also be utilized with the present subject matter as well (e.g., double ovens, electric cooktop ovens, induction cooktop ovens, etc.).

Thus, the present subject matter may be used with other oven appliance configurations (e.g., that define one or more interior cavities for the receipt of food or having different pan or rack arrangements than what is shown in FIG. 2). Further, the present subject matter may be used in a stand-alone cooktop, range appliance, or any other suitable appliance.

Oven appliance 10 generally includes a cooking assembly. In particular, the cooking assembly may include one or more heating elements. For example, in some embodiments, the cooking assembly, and thus the oven appliance 10 includes an insulated cabinet 12 with an interior cooking chamber 14 defined by an interior surface 15 of cabinet 12. Cooking chamber 14 is configured for the receipt of one or more food items to be cooked. As shown, chamber 14 is generally defined by a back wall 52, a top wall 54, and a bottom wall 56 spaced from top wall 54 along the vertical direction V by opposing side walls 58 (e.g., a first wall and a second wall).

Oven appliance 10 includes a door 16 rotatably mounted to cabinet 12 (e.g., with a hinge—not shown). A handle 18 may be mounted to door 16 and assists a user with opening and closing door 16 in order to access cooking chamber 14. For example, a user can pull on handle 18 to open or close door 16 and access cooking chamber 14.

In some embodiments, oven appliance 10 includes a seal (not shown) between door 16 and cabinet 12 that assists with maintaining heat and cooking fumes within cooking chamber 14 when door 16 is closed as shown in FIG. 2. Multiple parallel glass panes 22 may provide for viewing the contents of cooking chamber 14 when door 16 is closed and assist with insulating cooking chamber 14. A baking rack 24 is positioned in cooking chamber 14 for the receipt of food items or utensils (e.g., cooking plate 60) that make contain or support food items. Baking rack 24 may be slidably received onto embossed ribs or sliding rails 26 such that rack 24 may be conveniently moved into and out of cooking chamber 14 when door 16 is open.

In some embodiments, baking rack 24 defines a receiving zone on or within which a cooking plate 60 is disposed (e.g., removably mounted or, alternatively, fixedly mounted). Generally, cooking plate 60 may provide a cooking surface 62 on which a food item (e.g., bread or pizza) may be received. Cooking plate 60 may be provided as a solid-nonpermeable member or, alternatively, define one or more apertures through which air may pass. In some embodiments, cooking plate 60 includes or is formed from a heat-retaining material, such as clay, stone (e.g., cordierite), ceramic, cast iron, or ceramic-coated carbon steel. It is understood that cooking plate 60 may be formed as any suitable shape (e.g., circular or rectangular) on which food items may be supported.

As shown, oven appliance 10 includes one or more heating elements 40, 42 to heat chamber 14 (e.g., as directed by a controller 50 as part of a cooking operation). In certain embodiments, a gas fueled or electric bottom heating element 40 (e.g., a gas burner, microwave heating element, a resistive heating element, resistance wire elements, radiant heating element, electric tubular heater or CALROD®, halogen heating element, etc.) is positioned in cabinet 12, for example, at a bottom portion 30 of cabinet 12. Bottom heating element 40 is used to heat cooking chamber 14 for both cooking and cleaning of oven appliance 10. The size and heat output of bottom heating element 40 can be configured based on, for example, the size of oven appliance 10.

In additional or alternative embodiments, a top heating element 42 (e.g., a gas burner, microwave heating element, a resistive heating element, resistance wire elements, radiant heating element, electric tubular heater or CALROD®, halogen heating element, etc.) is positioned in cooking chamber 14 of cabinet 12, for example, at a top portion 32 of cabinet 12. Top heating element 42 is used to heat cooking chamber 14 for both cooking/broiling and cleaning of oven appliance 10. Like bottom heating element 40, the size and heat output of top heating element 42 can be configured based on for example, the size of oven appliance 10.

Generally, oven appliance 10 may include a controller 50 in operative communication (e.g., operably coupled via a wired or wireless channel) with one or more other portions of oven appliance 10 (e.g., heating elements 40, 42) via, for example, one or more signal lines or shared communication busses, and signals generated in controller 50 operate oven appliance 10 in response to user input via user inputs 122. Input/Output ("I/O") signals may be routed between controller 50 and various operational components of oven appliance 10 such that operation of oven appliance 10 can be regulated by controller 50. In addition, controller 50 may also be inoperative communication (e.g., wired or, alternatively, wireless communication) with one or more sensors, such as a first temperature sensor (TS1) 64 or a second temperature sensor (TS2) 66. Generally, either or both TS1 64 and TS2 66 may include or be provided as a thermistor or thermocouple, which may be used to measure temperature at a location within or proximate to chamber 14 and provide such measurements to the controller 50. Although TS1 64 is illustrated as being mounted on cooking plate 60 and TS2 66 is illustrated on a back wall 52 between top heating element 42 and bottom heating element 40, it should be appreciated that other sensor types, positions, and configurations may be used according to alternative embodiments.

Controller 50 is a "processing device" or "controller 50" and may be embodied as described herein. Controller 50 may include a memory and one or more microprocessors, microcontrollers, application-specific integrated circuits (ASICS), CPUs or the like, such as general or special purpose microprocessors operable to execute programming instructions or micro-control code associated with operation of oven appliance 10, and controller 50 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 50 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

As shown in FIG. 2, in certain embodiments, a cooling air flow passageway 28 can be provided within cabinet 12 between cooking chamber 14 and cooktop 100. For example, a portion of passageway 28 may be between cooking chamber 14 and cooktop 100 along a vertical direction V. Passageway 28 is shown schematically in the figures. As will be understood by one of skill in the art using the teachings disclosed herein, cooling air flow passageway 28 may have a variety of configurations other than as shown. Air flowing through passageway 28 can provide convective cooling.

In optional embodiments, the oven appliance 10 additionally includes a cooktop 100. Cooktop 100 may be disposed on the cabinet 12 such that the total volume of cabinet 12 is generally divided between the cooking chamber 14 and cooktop 100. As shown, cooktop 100 may include a top panel 104. By way of example, top panel 104 may be constructed of glass, ceramics, enameled steel, and combinations thereof. Heating assemblies 106 (e.g., induction heating elements, resistive heating elements, radiant heating elements, microwave, or gas burners) may be mounted, for example, on or below the top panel 104. While shown with four heating assemblies 106 in the exemplary embodiment of FIG. 1, cooktop appliance 10 may include any number of heating assemblies 106 in alternative exemplary embodiments. Heating assemblies 106 can also have various diameters. For example, each heating assembly of heating assemblies 106 can have a different diameter, the same diameter, or any suitable combination thereof.

As shown, oven appliance 10 includes a user interface panel 120, which may be located as shown, within convenient reach of a user of the oven appliance 10. User interface panel 120 is generally a component that allows a user to interact with the oven appliance 10 to, for example, turn various heating elements (such as heating elements 40, 42, 106) on and off, adjust the temperature of the heating elements, set built-in timers, etc. Although user interface panel 120 is shown mounted to a backsplash fixed to cabinet 12, alternative embodiments may provide user interface panel 120 at another suitable location (e.g., on a front portion of cabinet 12 above door 16).

In some embodiments, a user interface panel 120 may include one or more user-interface inputs 122 and a graphical display 124, which may be separate from or integrated with the user-interface inputs 122. The user-interface element 122 may include analog control elements (e.g., knobs, dials, or buttons) or digital control elements, such as a touchscreen comprising a plurality of elements thereon. Various commands for a user to select through the engagement with the user-interface inputs 122 may be displayed (e.g., by touchscreen at the inputs 122 or by the graphical display 124), and detection of the user selecting a specific command may be determined by the controller 50, which is in communication with the user-interface inputs 122, based on electrical signals therefrom. Additionally or alternatively, graphical display 124 may generally deliver certain information to the user, which may be based on user selections and interaction with the inputs 122, such as whether a one or more heating elements 40, 42 within cooking chamber 14 are activated or the temperature at which cooking chamber 14 is set. In certain embodiments, a discrete bake input is included with the inputs 122. User engagement of the bake input may activate the oven appliance 10 or initiate heating within cooking chamber 14 (e.g., such that cooking chamber 14 is directed to a default temperature setting).

Figure 3:
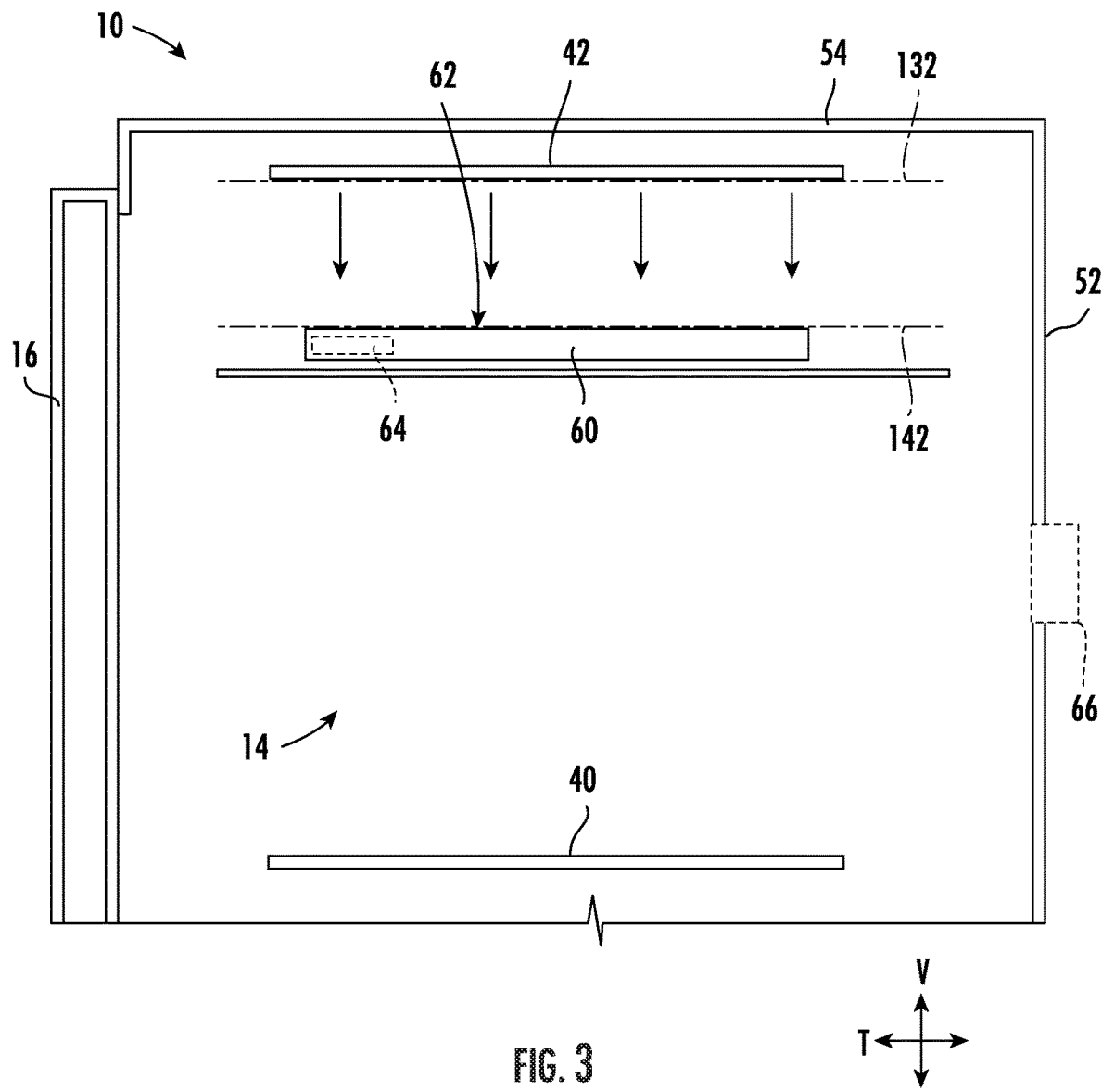
FIG. 3 provides a schematic section view of a portion of the exemplary oven appliance of FIG. 1.

Turning now to FIG. 3, a schematic section view of the upper end of oven 10, illustrating heat generated at top heating element 42 to cooking plate 60. As shown, one or more temperature sensors (e.g., TS1 64) may be mounted to cooking plate 60, for instance, to detect the temperature within cooking plate 60 or at cooking surface 62. As an example, TS1 64 may be disposed on a bottom surface of cooking plate 60 (e.g., via a mechanical fastener, clip, or hook). As an additional or alternative example, TS1 64 may be held within a recess in cooking plate 60. As an additional or alternative example, TS1 64 may be embedded within cooking plate 60.

Additionally or alternatively, one or more temperature sensors (e.g., TS2 66) may be disposed within the cabinet 12 proximate to or within chamber 14, for instance, to detect the (e.g., general or diffuse) temperature of chamber 14 below top heating element 42. Optionally, TS2 66 may be mounted between the top heating element 42 and the bottom heating element 40. In some embodiments, TS2 66 is mounted to a chamber wall. Specifically, TS2 66 may be laterally positioned between the side walls 58 or vertically positioned between the top wall 54 and bottom wall 56. As an example, TS2 66 may be disposed on back wall 52 (e.g., via a mechanical fastener, clip, or hook). As an additional or alternative example, TS2 66 may be held within a recess in back wall 52. As an additional or alternative example, TS2 66 may be embedded within back wall 52.

When assembled, the temperature sensor(s) TS1 64, TS2 66 may be operably coupled to controller 50. Moreover, the controller 50 may be configured to control top heating element 42 or bottom heating element 40 based on the temperature detected at the temperature sensor(s) TS1, TS2, (e.g., as part of a cooking operation, such as a short-cycle cooking operation). In some embodiments, a cooking operation initiated by the controller 50 may thus include detecting one or more temperatures of TS1 64 and TS2 66, and directing heat output from (e.g., a heat setting of) top heating element 42 or bottom heating element 40 based on the detected temperature.

As an example, and turning briefly to FIGS. 4 and 5, graphs are provided to illustrate a short-cycle cooking operation directed by controller 50 (FIG. 1) in operative communication with heating elements 40, 42 and TS1 64. In particular, FIG. 4 provides a graph of temperature line TL1 detected at TS1 64. FIG. 5 provides a graph of output line P for power output as a percentage of maximum output (e.g., as dictated by a duty cycle or TRIAC) at top heating element 42. As shown, the cooking operation may include a preheat cycle CP in which top heating element 42 is set at a relatively high first output setting (e.g., between 80% and 100%). Optionally, the high output setting may be maintained continuously for the entirety of the preheat cycle CP. The bottom heater output (i.e., heat output setting of the bottom heating element 40) may be restricted (e.g., at 0%). The preheat cycle CP may be initiated, for instance, in response to an input signal received from user interface panel 120 (e.g., based on a user selection for the short-cycle cooking operation). Generally, during the preheat cycle CP, temperature (e.g., as measured along TL1) increases at the cooking surface 62 until a preheat threshold HP1 is met. For instance, the preheat cycle CP may continue until a preheat threshold HP1 is met or exceeded (e.g., at TL1). Advantageously, the cooking plate 60 or surface 62 within the chamber 14 may be brought to a relatively high temperature without reaching excessive or undesirable temperatures within the rest of chamber 14.

Following the preheat cycle CP (e.g., immediately thereafter), a maintenance cycle CM may be initiated in which top heating element 42 is directed to maintain a preheat threshold HP1. For instance, top heating element 42 may be set at a maintenance output setting that is less than the relatively high output setting of the preheat cycle CP (e.g., between 10% and 80%). For instance, top heating element 42 may be cycled on-off between an upper maintenance threshold MU and a lower maintenance threshold ML. Optionally, top heating element 42 may be activated until it is determined that upper maintenance threshold MU is reached, then restricted (e.g., deactivated) until it is determined that lower maintenance threshold ML is reached, at which point top heating element 42 may be again activated and the deactivation/activation is repeated. The bottom heater output (i.e., heat output setting of the bottom heating element 40) may be restricted (e.g., at 0%). The maintenance cycle CM may continue indefinitely until cooking is desired to start. For instance, the maintenance cycle CM may continue until a cooking input signal is received from user interface panel 120 (e.g., based on a user selection to indicate that cooking should begin) or another suitable input device.

Following the preheat cycle CP or maintenance cycle CM, a cooking cycle CC may be initiated. Specifically, activation of the top heating element 42 may be directed based on the cooking cycle CC. During the cooking cycle CC, top heating element 42 is set at a relatively high output setting (e.g., between 80% and 100%). The bottom heater output (i.e., heat output setting of the bottom heating element 40) may be restricted (e.g., at 0%). Optionally, the high output setting may be maintained continuously for the entirety of the cooking cycle CC. Alternatively, the relatively high output setting may be variable such that heat output changes. Additionally or alternatively, the relatively high output setting may be configured to maintain temperature at the cooking surface 62 above the preheat temperature (e.g., cycled between a cooking maximum threshold HP2 and cooking resumption threshold MC that is greater than the preheat threshold HP1).

The cooking cycle activation of the top heating element 42 may continue for a predetermined time interval. In other words, the duration of the cooking cycle activation may be set as the predetermined time interval. Following expiration of the predetermined time interval (e.g., which is started with the start of cooking cycle CC), the cooking cycle CC may be discontinued.

Subsequent to the cooking cycle CC (e.g., following expiration of the predetermined time interval), a restricted or recharge cycle CR may be initiated in which the heat output of the top heating element 42 is reduced from the heat output at the cooking cycle CC. In some embodiments, top heater output is set at a restricted output setting below the high output setting of the cooking cycle CC (e.g., between 10% and 80%). The restricted cycle CR may continue until a permissive condition is met. Optionally, the permissive condition may be a determination that a recharge threshold, such as a restriction lower limit HP3 (e.g., at TS1 64) is met or surpassed (i.e., TL1 has been reached or has fallen below restriction lower limit HP3). Alternatively, the permissive condition may be another expiration condition (e.g., expiration of a predetermined cool-down time period following the start of the restricted cycle CR). Notably, in practice, the duration of the restricted cycle CR may be less than the duration of the preheat cycle CP. Advantageously, excessive heat may be prevented from accumulating within the chamber 14, generally, while maintaining the cooking plate 60 or surface 62 at a relatively high temperature (e.g., for cooking additional or successive food items).

It is noted that although FIG. 4 generally illustrates an experimental example of temperature at TS1 wherein no food is present. In practice, the presence of food (e.g., introduced during the cooking cycle) is likely to result in a gradual decline in temperature through the cooking cycle. In turn, once such food is removed and the restricted cycle CR proceeds, temperature at TS1 is likely to rise (e.g., until the restriction lower limit HP3 is met or expiration of the predetermined cool-down time period).

Following the restricted cycle CR (e.g., immediately thereafter), one or more cycles may be repeated. As an example, a second or additional maintenance cycle CM may be initiated, similar to the first maintenance cycle. As an additional or alternative example, a second or additional cooking cycle CC may be initiated, similar to the first cooking cycle CC. Subsequently, additional restricted cycles CR, maintenance cycles CM, or cooking cycles CC may be performed, as would be understood (e.g., until a user deactivates the cooking appliance 10 or otherwise stops the cooking operation altogether).

As another example, and turning briefly to FIGS. 6 and 7, graphs are provided to illustrate a short-cycle cooking operation directed by controller 50 (FIG. 1) in operative communication with heating elements 40, 42 and TS2 66. In particular, FIG. 6 provides a graph of temperature line TL2 detected at TS2 66. FIG. 7 provides a graph of output line P for power output as a percentage of maximum output (e.g., as dictated by a duty cycle or TRIAC) at top heating element 42. As shown, the cooking operation may include a preheat cycle CP in which top heating element 42 is set at a relatively high first output setting (e.g., between 80% and 100%). Optionally, the high output setting may be maintained continuously for the entirety of the preheat cycle CP. The bottom heater output (i.e., heat output setting of the bottom heating element 40) may be restricted (e.g., at 0%). The preheat cycle CP may be initiated, for instance, in response to an input signal received from user interface panel 120 (e.g., based on a user selection for the short-cycle cooking operation). Generally, during the preheat cycle CP, temperature (e.g., as measured along TL2) increases within the cooking chamber 14 until a preheat threshold HP1 is met. For instance, the preheat cycle CP may continue until a preheat threshold HP1 is met or exceeded (e.g., at TL2). Advantageously, the cooking plate 60 or surface 62 within the chamber 14 may be brought to a relatively high temperature without reaching excessive or undesirable temperatures within the rest of chamber 14.

Following the preheat cycle CP (e.g., immediately thereafter), a maintenance cycle CM may be initiated in which top heating element 42 is directed to maintain a preheat threshold HP1. For instance, top heating element 42 may be set at a maintenance output setting that is less than the relatively high output setting of the preheat cycle CP (e.g., between 10% and 80%). For instance, top heating element 42 may be cycled on-off between an upper maintenance threshold MU and a lower maintenance threshold ML. Optionally, top heating element 42 may be activated until it is determined that upper maintenance threshold MU is reached, then restricted (e.g., deactivated) until it is determined that lower maintenance threshold ML is reached, at which point top heating element 42 may be again activated and the deactivation/activation is repeated. The bottom heater output (i.e., heat output setting of the bottom heating element 40) may be restricted (e.g., at 0%). The maintenance cycle CM may continue indefinitely until cooking is desired to start. For instance, the maintenance cycle CM may continue until a cooking input signal is received from user interface panel 120 (e.g., based on a user selection to indicate that cooking should begin) or another suitable input device.

Following the preheat cycle CP or maintenance cycle CM, a cooking cycle CC may be initiated. Specifically, activation of the top heating element 42 may be directed based on the cooking cycle CC. During the cooking cycle CC, top heating element 42 is set at a relatively high output setting (e.g., between 80% and 100%). The bottom heater output (i.e., heat output setting of the bottom heating element 40) may be restricted (e.g., at 0%). Optionally, the high output setting may be maintained continuously for the entirety of the cooking cycle CC. Alternatively, the relatively high output setting may be variable such that heat output changes. Additionally or alternatively, the relatively high output setting may be configured to maintain temperature within chamber 14 above the preheat temperature (e.g., cycled between a cooking maximum threshold HP2 and cooking resumption threshold MC that is greater than the preheat threshold HP1).

The cooking cycle activation of the top heating element 42 may continue for a predetermined time interval. In other words, the duration of the cooking cycle activation may be set as the predetermined time interval. Following expiration of the predetermined time interval (e.g., which is started with the start of cooking cycle CC), the cooking cycle CC may be discontinued.

Subsequent to the cooking cycle CC (e.g., following expiration of the predetermined time interval), a restricted or recharge cycle CR may be initiated in which the heat output of the top heating element 42 is reduced from the cooking cycle CC. In some embodiments, top heater output is set at a restricted output setting below the high output setting of the cooking cycle CC (e.g., between 10% and 80%). The restricted cycle CR may continue until a permissive condition is met. Optionally, the permissive condition may be a determination that a recharge threshold, such as a restriction lower limit HP3 (e.g., at TS2 66) is met or surpassed (i.e., TL2 has been reached or has fallen below the restriction lower limit). Alternatively, the permissive condition may be another expiration condition (e.g., expiration of a predetermined cool-down time period following the start of the restricted cycle CR). Notably, in practice, the duration of the restricted cycle CR may be less than the duration of the preheat cycle CP. Advantageously, excessive heat may be prevented from accumulating within the chamber 14, generally, while maintaining the cooking plate 60 or surface 62 at a relatively high temperature (e.g., for cooking additional or successive food items).

Following the restricted cycle CR (e.g., immediately thereafter), one or more cycles may be repeated. As an example, a second or additional maintenance cycle CM may be initiated, similar to the first maintenance cycle. As an additional or alternative example a second or additional cooking cycle CC may be initiated, similar to the first cooking cycle CC. Subsequently, additional restricted cycles CR, maintenance cycles CM, or cooking cycles CC may be performed, as would be understood (e.g., until a user deactivates the cooking appliance 10 or otherwise stops the cooking operation altogether).

As yet another example, and turning briefly to FIGS. 8 and 9, graphs are provided to illustrate a short-cycle cooking operation directed by controller 50 (FIG. 1) in operative communication with heating elements 40, 42 and TS2 66. In particular, FIG. 8 provides a graph of temperature line TL2 detected at TS2 66. FIG. 9 provides a graph of output line P for power output as a percentage of maximum output (e.g., as dictated by a duty cycle or TRIAC) at top heating element 42. As shown, the cooking operation may include a preheat cycle CP in which top heating element 42 is set at a relatively high first output setting (e.g., between 80% and 100%). Optionally, the high output setting may be maintained continuously for the entirety of the preheat cycle CP. The bottom heater output (i.e., heat output setting of the bottom heating element 40) may be restricted (e.g., at 0%). The preheat cycle CP may be initiated, for instance, in response to an input signal received from user interface panel 120 (e.g., based on a user selection for the short-cycle cooking operation). Generally, during the preheat cycle CP, temperature (e.g., as measured along TL2) increases within the cooking chamber 14 until a preheat threshold HP1 is met. For instance, the preheat cycle CP may continue until a preheat threshold HP1 is met or exceeded (e.g., at TL2). Advantageously, the cooking plate 60 or surface 62 within the chamber 14 may be brought to a relatively high temperature without reaching excessive or undesirable temperatures within the rest of chamber 14.

Following the preheat cycle CP (e.g., immediately thereafter), a maintenance cycle CM may be initiated in which top heating element 42 is directed to maintain a preheat threshold HP1. For instance, top heating element 42 may be set at a maintenance output setting that is less than the relatively high output setting of the preheat cycle CP (e.g., between 10% and 80%). For instance, top heating element 42 may be cycled on-off between an upper maintenance threshold MU and a lower maintenance threshold ML. Optionally, top heating element 42 may be activated until it is determined that upper maintenance threshold MU is reached, then restricted (e.g., deactivated) until it is determined that lower maintenance threshold ML is reached, at which point top heating element 42 may be again activated and the deactivation/activation is repeated. The bottom heater output (i.e., heat output setting of the bottom heating element 40) may be restricted (e.g., at 0%). The maintenance cycle CM may continue indefinitely until cooking is desired to start. For instance, the maintenance cycle CM may continue until a cooking input signal is received from user interface panel 120 (e.g., based on a user selection to indicate that cooking should begin) or another suitable input device.

Following the preheat cycle CP or maintenance cycle CM, a cooking cycle CC may be initiated. Specifically, activation of the top heating element 42 may be directed based on the cooking cycle CC. During the cooking cycle CC, top heating element 42 is set at a relatively high output setting (e.g., between 80% and 100%). The bottom heater output (i.e., heat output setting of the bottom heating element 40) may be restricted (e.g., at 0%). Optionally, the high output setting may be maintained continuously for the entirety of the cooking cycle CC. Alternatively, the relatively high output setting may be variable such that heat output changes. Additionally or alternatively, the relatively high output setting may be configured to maintain temperature within chamber 14 above the preheat temperature (e.g., or below a cooking maximum threshold HP2 that is greater than the preheat threshold HP1).

The cooking cycle activation of the top heating element 42 may continue for a predetermined time interval. In other words, the duration of the cooking cycle activation may be set as the predetermined time interval. Following expiration of the predetermined time interval (e.g., which is started with the start of cooking cycle CC), the cooking cycle CC may be discontinued.

Subsequent to the cooking cycle CC (e.g., following expiration of the predetermined time interval), a restricted or recharge cycle CR may be initiated in which the heat output of the top heating element 42 is reduced from the cooking cycle CC. In some embodiments, top heater output is set at steady restricted output setting (e.g., as may be controlled by a TRIAC) below the high output setting of the cooking cycle CC (e.g., 0% or a setting between 10% and 80%). The steady restricted output setting may be greater than, less than, or equal to the maintenance output setting. The restricted cycle CR may continue until a permissive condition is met. Optionally, the permissive condition may be a determination that a recharge threshold, such as a restriction lower limit HP3 (e.g., at TS2 66) is met or surpassed (i.e., TL2 has been reached or has fallen below the restriction lower limit). Alternatively, the permissive condition may be another expiration condition (e.g., expiration of a predetermined cool-down time period following the start of the restricted cycle CR). Notably, in practice, the duration of the restricted cycle CR may be less than the duration of the preheat cycle CP. Advantageously, excessive heat may be prevented from accumulating within the chamber 14, generally, while maintaining the cooking plate 60 or surface 62 at a relatively high temperature (e.g., for cooking additional or successive food items).

Following the restricted cycle CR (e.g., immediately thereafter), one or more cycles may be repeated. As an example, a second or additional maintenance cycle CM may be initiated, similar to the first maintenance cycle. As an additional or alternative example a second or additional cooking cycle CC may be initiated, similar to the first cooking cycle CC. Subsequently, additional restricted cycles CR, maintenance cycles CM, or cooking cycles CC may be performed, as would be understood (e.g., until a user deactivates the cooking appliance 10 or otherwise stops the cooking operation altogether).

Figure 10:
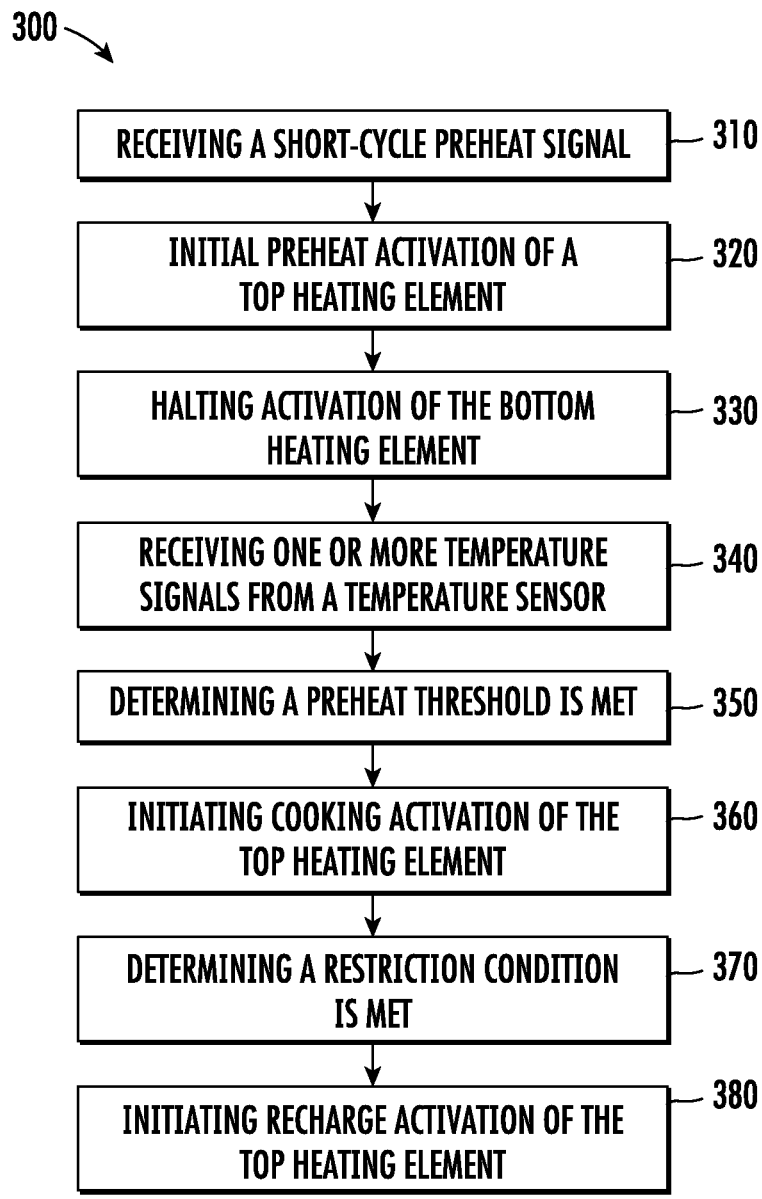
FIG. 10 is a flow chart illustrating of method of operating an oven appliance according to exemplary embodiments of the present disclosure.

Referring now to FIG. 10, the present disclosure may further be directed to methods (e.g., method 300) of operating an oven appliance, such as appliance 10. In exemplary embodiments, the controller 50 may be operable to perform various steps of a method in accordance with the present disclosure.

The methods (e.g., 300) may occur as, or as part of, a cooking operation (e.g., short-cycle cooking operation) of oven appliance 10. In particular, the methods (e.g., 300) disclosed herein may advantageously facilitate a cooking plate or surface within a cooking chamber to be brought to a relatively high temperature without reaching excessive or undesirable temperatures within the rest of the cooking chamber. Additionally or alternatively, the methods (e.g., 300) may advantageously permit multiple cooking cycles to be performed in relatively quick succession (e.g., without requiring deactivation of all heating elements or significant cooling of the cooking chamber).

It is noted that the order of steps within method 300 are for illustrative purposes. Except as otherwise indicated, one or more steps in the below method 300 may be changed, rearranged, performed in a different order, or otherwise modified without deviating from the scope of the present disclosure.

Turning now to FIG. 10, at 310, the method 300 includes receiving a short-cycle preheat signal. Generally, the short-cycle preheat signal may indicate that a short-cycle or localized, high-heat cooking operation is planned (e.g., by a user). For instance, the short-cycle preheat signal may correspond to a user input (e.g., at the user interface panel). Thus, user engagement of a short-cycle button or input at the user interface panel may transmit the short-cycle preheat signal to the controller.

At 320, the method 300 includes initiating preheat activation of a top heating element. Specifically, preheat activation of the top heating element may be initiated as part of a preheat cycle of the oven appliance. In some embodiments,

320 includes turning on or otherwise increasing power or fuel to the top heating element (e.g., from 0%). For instance, the top heating element may be activated according to a predetermined preheat power or heat output setting (e.g., as a percentage of maximum output as dictated by a duty cycle or TRIAC), such a first heat output setting.

In certain embodiments, the predetermined preheat power output of the top heating element is a relatively high output setting (e.g., greater than 50%). Optionally, the predetermined first heat output setting of the top heating element may be greater than 75%. Additionally or alternatively, the predetermined first heat output setting of the top heating element may be between 80% and 100%. For instance, the first heat output setting may be 100% (i.e., the maximum permitted output setting).

Generally, once activated, the top heating element may be maintained in an active state in which power or fuel is directed to the top heating element to generate heat for the duration of the preheat cycle. For instance, the power or heat output of the top heating element may be maintained above 0% (e.g., at a directed duty cycle or constant output). Optionally, the power or heat output of the top heating element may be maintained at the first heat output setting.

At 330, the method 300 includes halting activation of the bottom heating element. For instance, the power or heat output of the bottom heating element may be maintained at 0%. In some embodiments, 330 continues during the preheat activation of 320. Thus, the bottom heating element may be "off" for the duration of 320. Optionally, 330 may continue through the entire cooking operation or method 300.

At 340, the method 300 includes receiving one or more temperature signals from a temperature sensor (e.g., TS1 or TS2), as described above. In particular, 340 may occur during the preheat cycle. For instance, temperature signals may be received by the controller at a predetermined rate or at regular intervals to determine the temperature of the cooking surface. The temperature signals of 340 may be received during the preheat cycle. In certain embodiments, 340 occurs during preheat activation of the 320. Thus, multiple temperature measurements may be obtained for the cooking chamber during the preheat cycle.

At 350, the method 300 includes determining a preheat threshold is met based on the received one or more temperature signals. Determination of the preheat threshold being met may, for example, generally indicate the completion of the preheat cycle or that the desired conditions for cooking have been generally met. In some embodiments, the preheat threshold may thus be met when a temperature signal from the temperature sensor is greater than the preheat threshold.

Optionally, absent any further instructions (e.g., to initiate a cooking cycle), the preheat conditions may be maintained within the cooking chamber (e.g., for a predetermined period of time following 350 according to a feedback loop).

At 360, the method 300 includes initiating cooking activation of the top heating element based on a cooking cycle following the preheat cycle (e.g., subsequent to 350). For instance, the cooking cycle may have a predetermined time interval that is initiated with 360. In other words, a countdown of the predetermined time interval may begin with 360. During 360, the top heating element may be directed to a relatively high heat output setting (e.g., greater than 50%). Optionally, the second heat output setting of the top heating element may be greater than 75%. Additionally or alternatively, the second heat output setting of the top heating element may be between 80% and 100%. Further additionally or alternatively, the second heat output setting of the top heating element may be lower (i.e., less) than the first heat output setting.

In some embodiments, the method 300 can include receiving one or more temperature signals from the temperature sensor during the cooking cycle (e.g., during the cooking activation of 360). Optionally, 360 may include directing the top heating element based on the temperature detected at the temperature sensor (e.g., from the received temperature signals). For instance, 360 may include determining a maximum threshold is reached at the temperature sensor. In response to the maximum threshold being determined or reached, activation of the top heating element may be halted (e.g., directed to 0% or otherwise reduced). Subsequently, the temperature within cooking chamber may fall, and it may be determined that a resumption threshold less than the maximum threshold is reached (e.g., based on additional received temperature signals from the temperature sensor). In response to determining the resumption threshold is reached, cooking activation of the top heating element may again be permitted (e.g., at the second heat output setting). As would be understood, such actions may be repeated (e.g., according to a feedback loop) during the cooking cycle. The end of the cooking cycle may coincide with or indicate a food item (e.g., pizza) has finished cooking within the cooking chamber (e.g., on the cooking surface).

At 370, the method 300 includes determining a restriction condition is met subsequent to the predetermined time interval (e.g., after the food item has been removed from the cooking chamber). Generally, the restriction condition may indicate the cooking cycle has ended. For instance, 370 may include determining expiration of the predetermined time interval (i.e., that the countdown of the predetermined time interval has been completed). Optionally, the predetermined time interval may be a period of time between 2 minutes and 10 minutes. Additionally or alternatively, the predetermined time interval may be between 2 minutes and 4 minutes At 380, the method 300 includes initiating recharge activation of the top heating element in response to determining the restriction condition. Generally, recharge activation may direct the cooking chamber to a lower temperature (e.g., according to a restricted or recharge cycle). Thus, heat output at the top heating element may be reduced. For instance, 380 may require deactivating the top heating element (i.e., directing the heat output to 0%) or activating the top heating element according to a predetermined low-output cooking power or heat output setting (e.g., less than the second heat output setting or between 10% and 50%).

In some embodiments, the method 300 can include receiving one or more temperature signals from the temperature sensor during the restriction condition (e.g., during the recharge activation of 380). Optionally, 380 may include directing the top heating element based on the temperature detected at the temperature sensor (e.g., from the received temperature signals) and, in particular, according to a recharge threshold. For instance, 380 may include directing the top heating element to maintain the cooking surface at the recharge threshold (e.g., as part of a maintenance cycle directing temperature between an upper recharge threshold and a lower recharge threshold). As would be understood, such actions may be continued or repeated (e.g., according to a feedback loop) during the restriction condition. Optionally, the recharge threshold may be equal to the preheat threshold. Alternatively, the recharge threshold may be distinct from (e.g., less than or, alternatively, greater than) the preheat threshold.

Subsequent to 380, the method may return to a cooking cycle (e.g., at or as a repeat of 360), such as might be desired if a second pizza or food item is to be cooked. Moreover, steps 370 and 380 may be repeated, as would be understood in light of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance comprising:
    a cabinet;
    a plurality of chamber walls mounted within the cabinet, the plurality of chamber walls defining a cooking chamber, the plurality of chamber walls comprising a back wall, a top wall, a first side wall, a second side wall, and a bottom wall;
    a cooking surface defined in the cooking chamber between the bottom wall and the top wall of the plurality of chamber walls;
    a top heating element mounted above the cooking surface to heat the cooking chamber;
    a temperature sensor disposed within the cabinet; and
    a controller in operative communication with the top heating element and the temperature sensor, the controller being configured to initiate a cooking operation comprising
        initiating preheat activation of the top heating element,
        receiving one or more temperature signals from the temperature sensor, receiving occurring during the preheat activation of the top heating element,
        determining a preheat threshold is met based on the received one or more temperature signals, and
        initiating cooking activation of the top heating element based on a cooking cycle having a predetermined time interval subsequent to determining the preheat threshold is met, initiating cooking activation comprising directing the top heating element based on the cooking cycle for the predetermined time interval.

2. The oven appliance of claim 1, wherein initiating preheat activation of the top heating element comprises directing the top heating element to a first heat output setting, and wherein initiating cooking activation of the top heating element comprises directing the top heating element to a second heat output setting, the second heat output setting being lower than the first heat output setting.

3. The oven appliance of claim 2, wherein the first output setting is a maximum permitted output setting.

4. The oven appliance of claim 1, wherein the oven appliance further comprises a bottom heating element mounted below the top heating element to heat the cooking surface, and wherein the method further comprises halting activation of the bottom heating element during the preheat activation of the top heating element.

5. The oven appliance of claim 1, wherein the cooking operation further comprises
    determining a maximum threshold is reached at the temperature sensor, and
    halting activation of the top heating element in response to determining the maximum threshold.

6. The oven appliance of claim 5, wherein the cooking operation further comprises
    determining a resumption threshold is reached following determining the maximum threshold, and
    permitting cooking activation of the top heating element in response to determining the resumption threshold is reached.

7. The oven appliance of claim 1, wherein the temperature sensor is mounted on the plurality of chamber walls.

8. The oven appliance of claim 1, further comprising:
    a cooking plate removably received within the cooking chamber, the cooking plate defining the cooking surface, wherein the temperature sensor is mounted on the cooking plate.

9. The oven appliance of claim 1, wherein the cooking operation further comprises
    determining a restriction condition is met subsequent to the predetermined time interval,
    initiating recharge activation of the top heating element based on a recharge cycle to reduce heat output at the top heating element in response to determining the restriction condition,
    receiving one or more temperature signals from the temperature sensor during the restriction condition, and
    directing the top heating element according to a recharge threshold based on the one or more temperature signals from the temperature sensor during the restriction condition.

10. The oven appliance of claim 9, wherein the recharge threshold is distinct from the preheat threshold.

11. A method of operating an oven appliance comprising a plurality of chamber walls mounted within a cabinet and defining a cooking chamber, a cooking surface defined in the cooking chamber between a bottom wall and a top wall of the plurality of chamber walls, and a top heating element mounted above the cooking surface to heat the cooking chamber, the method comprising:
    initiating preheat activation of the top heating element;
    receiving one or more temperature signals from a temperature sensor disposed within the oven appliance, receiving occurring during the preheat activation of the top heating element;
    determining a preheat threshold is met based on the received one or more temperature signals; and
    initiating cooking activation of the top heating element based on a cooking cycle having a predetermined time interval subsequent to determining the preheat threshold is met, initiating cooking activation comprising directing the top heating element based on the cooking cycle for the predetermined time interval.

12. The method of claim 11, wherein initiating preheat activation of the top heating element comprises directing the top heating element to a first heat output setting, and wherein initiating cooking activation of the top heating element comprises directing the top heating element to a second heat output setting, the second heat output setting being lower than the first heat output setting.

13. The method of claim 12, wherein the first output setting is a maximum permitted output setting.

14. The method of claim 11, wherein the oven appliance further comprises a bottom heating element mounted below the top heating element to heat the cooking surface, and wherein the method further comprises halting activation of the bottom heating element during the preheat activation of the top heating element.

15. The method of claim 11, determining a maximum threshold is reached at the temperature sensor; and halting activation of the top heating element in response to determining the maximum threshold.

16. The method of claim 15, further comprising:
  determining a resumption threshold is reached following determining the maximum threshold; and
  permitting cooking activation of the top heating element in response to determining the resumption threshold is reached.

17. The method of claim 11, wherein the temperature sensor is mounted on the plurality of chamber walls.

18. The method of claim 11, wherein the temperature sensor is mounted on a cooking plate defining the cooking surface, the cooking plate being removably received within the cooking chamber.

19. The method of claim 11, further comprising:
  determining a restriction condition is met subsequent to the predetermined time interval;
  initiating recharge activation of the top heating element based on a recharge cycle to reduce heat output at the top heating element in response to determining the restriction condition;
  receiving one or more temperature signals from the temperature sensor during the restriction condition; and
  directing the top heating element according to a recharge threshold based on the one or more temperature signals from the temperature sensor during the restriction condition.

20. The method of claim 19, wherein the recharge threshold is distinct from the preheat threshold.

\* \* \* \* \*